United States Patent
Wassink

(10) Patent No.: US 6,686,708 B2
(45) Date of Patent: Feb. 3, 2004

(54) DISPLAY DEVICE COMPRISING A DEFLECTION UNIT

(75) Inventor: Michiel Harjon Wassink, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 239 days.

(21) Appl. No.: 09/902,932

(22) Filed: Jul. 11, 2001

(65) Prior Publication Data

US 2002/0005691 A1 Jan. 17, 2002

(30) Foreign Application Priority Data

Jul. 13, 2000 (EP) .............................................. 00202497

(51) Int. Cl.$^7$ ................................................ G09G 1/24
(52) U.S. Cl. ...................................... 315/370; 313/421
(58) Field of Search ................................. 313/421, 431, 313/478, 479, 440, 412; 315/370, 371, 368.11

(56) References Cited

U.S. PATENT DOCUMENTS

| | | | |
|---|---|---|---|
| 4,746,837 A | 5/1988 | Vink | ............................ 313/431 |
| 5,446,339 A * | 8/1995 | Kinoshita et al. | ............ 313/478 |
| 6,326,742 B1 * | 12/2001 | Iwasaki et al. | ............. 315/370 |
| 6,384,546 B2 * | 5/2002 | Nakajima | .................... 315/371 |

FOREIGN PATENT DOCUMENTS

| | | | |
|---|---|---|---|
| JP | 2-220336 | 9/1990 | ............. H01J/29/76 |
| JP | 7-212773 | 8/1995 | ............. H04N/9/28 |
| JP | 7-212778 | 8/1995 | ............. H04N/9/28 |

OTHER PUBLICATIONS

Copy of International Search Report dated Oct. 31, 2001 for corresponding PCT application, PCT/EP01/07405.

* cited by examiner

*Primary Examiner*—Don Wong
*Assistant Examiner*—Jimmy T. Vu

(57) ABSTRACT

A color display device comprising a cathode ray tube and a deflection unit is described. The display device includes compensation coils for correcting a raster distortion in the raster displayed on the screen and means for providing correction currents through the correction coils. The ratio between the correction current $I_{24}$ and the vertical deflection current $I_{21}$ is higher at half vertical deflection than at full vertical deflection.

15 Claims, 4 Drawing Sheets

DISPLAY DEVICE COMPRISING A DEFLECTION UNIT

BACKGROUND OF THE INVENTION

The invention relates to a color display device comprising a cathode ray tube, means for generating at least one electron beam, a display screen, and a deflection unit for generating deflection fields for deflecting electron beam(s) across the display screen, and magnetic field-generating means at or near a display screen-facing end of the deflection unit to reduce raster distortions.

U.S. Pat. No. 4,746,837 discloses a color display device having a deflection unit, in which a number of pole shoes are arranged around the deflection unit and at the side of the deflection unit facing the display screen. A pincushion-shaped distortion of the deflection field is formed between the pole shoes. Said pincushion distortion provides for a raster correction.

Although the known devices and similar devices in which magnetic correction fields are provided substantially reduce raster errors especially in the corners of the display screen, remaining raster errors are still noticeable, especially at 0.5 N and 0.5 S of the display screen.

SUMMARY OF THE INVENTION

It is an object of the invention to provide a display device having a deflection unit in which improved raster corrections are obtainable.

To this end, in accordance with an aspect of the invention, the display device according to the invention is characterized in that the magnetic field-generating means comprise correction coils and means for supplying said correction coils, in operation, with a correction current, the ratio between the correction current and the vertical deflection current being a function of the vertical deflection and being less for full vertical deflection than for half vertical deflection.

The invention is based on the recognition that, when a correction field, for which the strength is proportional to the strength of the vertical deflection field, is generated independently of the vertical direction (as is the case in the prior art because the poles divert the flux of the vertical deflection coils and thus the strength of the correction field is directly proportional to the vertical deflection field), it is possible to correct for raster distortions at the top and bottom (North and South) of the display screen, but raster corrections at positions between the bottom and top of the display screen and the East-West axis of the display screen are less than optimally performed. In the display device and deflection unit in accordance with the invention, the ratio of the current through the correction coils and the current through the vertical deflection coils is less for full vertical deflection than for half vertical deflection.

This enables the correction coils to better influence the inner pincushion errors (i.e. around 0.5 North and South vertical deflection) as well as the geometry along the edges. An improved raster correction is thereby obtainable.

Preferably, said ratio of the currents at half the vertical deflection is between 1.5 and 2.5 times larger than that at full vertical deflection.

Preferably, the delay time between the current through the correction coils and the current through the vertical deflection coils after fly-back is less than 400 $\mu$sec, preferably less than 300 $\mu$sec. A larger delay time introduces raster distortions in North or South.

BRIEF DESCRIPTION OF THE DRAWINGS

These and further aspects of the invention will be explained in greater detail by way of example and with reference to the accompanying drawings, in which.

The Figures are not drawn to scale. In general, like reference numerals refer to like parts.

DETAILED DESCRIPTION OF PREFERRED EMBODIMENTS

Figure 1:
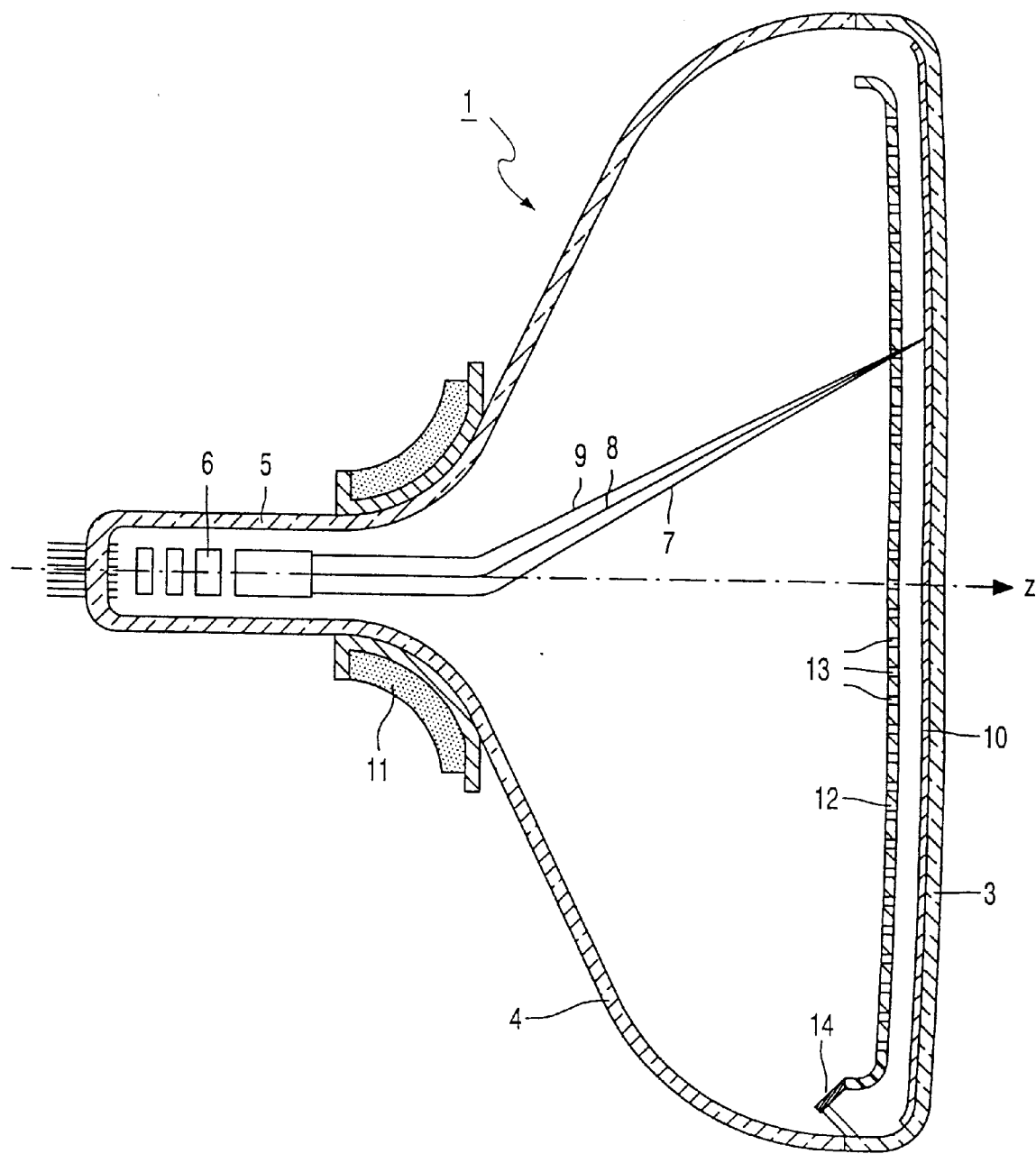
FIG. 1 is a display device.

A color display device 1 (FIG. 1) includes an evacuated envelope 2 comprising a display window 3, a cone portion 4 and a neck 5. Said neck 5 accomodates an electron gun 6 for generating three electron beams 7, 8 and 9. A display screen 10 is present on the innerside of the display window. Said display screen 10 comprises a phosphor pattern of phosphor elements luminescing in red, green and blue. On their way to the display screen, the electron beams 7, 8 and 9 are deflected across the display screen 10 by means of a deflection unit 11 and pass through a shadow mask 12 which is arranged in front of the display window 3 and comprises a thin plate having apertures 13. The shadow mask is suspended in the display window by means of suspension means 14. The three electron beams converge and pass through the apertures of the shadow mask at a small angle with respect to each other and, consequently, each electron beam impinges on phosphor elements of only one color. In FIG. 1 the axis (z-axis) of the envelope is also indicated.

Figure 2:
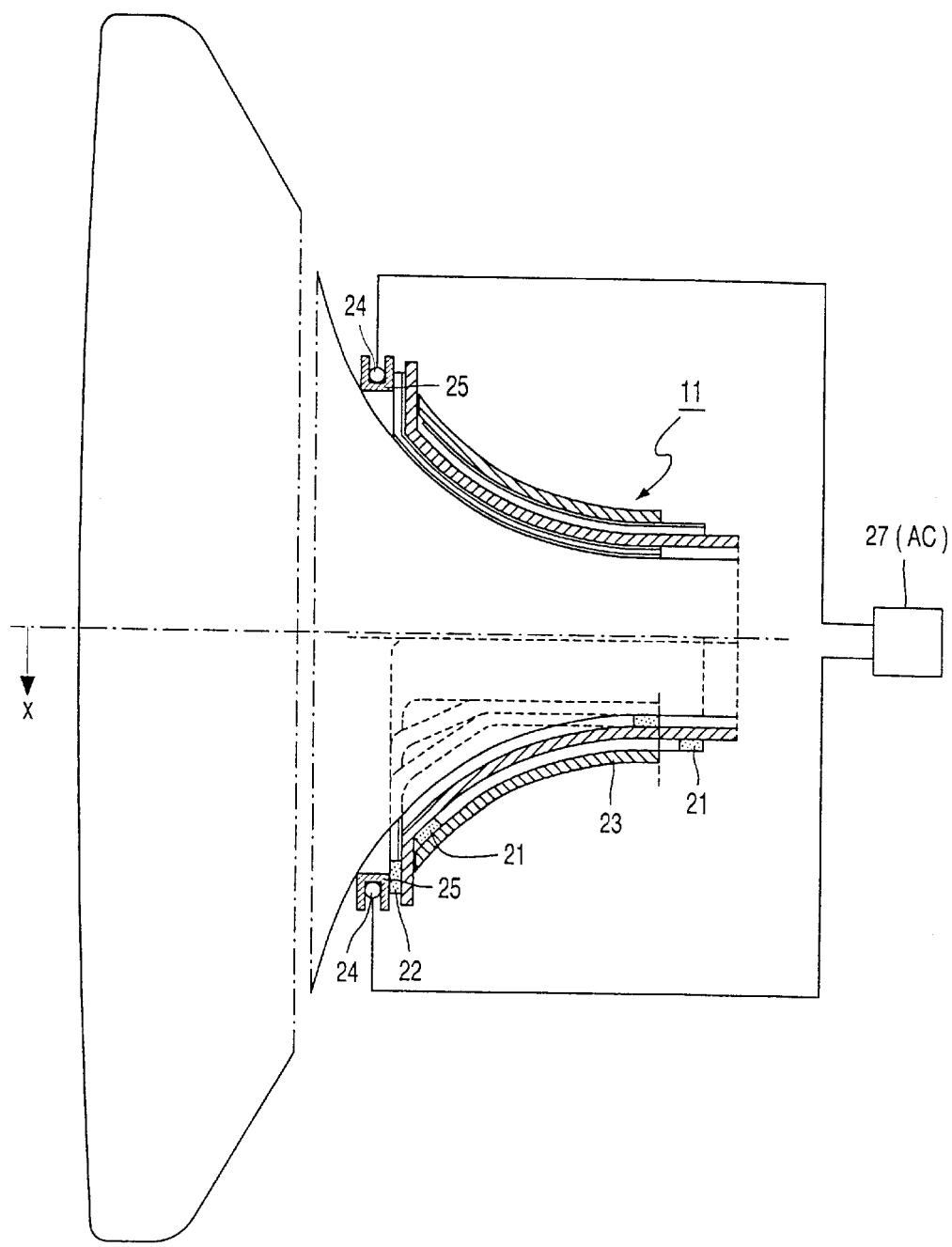
FIG. 2 is a sectional view of a deflection unit comprising compensation coils.

FIG. 2 is a sectional view of a deflection unit in accordance with the invention. Said deflection unit comprises two deflection coil systems 21 and 22 for deflecting the electron beams in two mutually perpendicular directions. Coil system 21 comprises coils for the vertical deflection (deflection with relatively low frequency) of the electron beams. In this example, the deflection unit further comprises a yoke 23. Said yoke is made of a soft-magnetic material. Compensation coils 24 are arranged around the display device, in this example on the deflection unit 11. In this example, compensation coils 24 are fitted into a holder 25. Means 27 are provided to supply coils 24, in operation, with a current of the same frequency as the vertical deflection current though coils 21.

Figure 3:
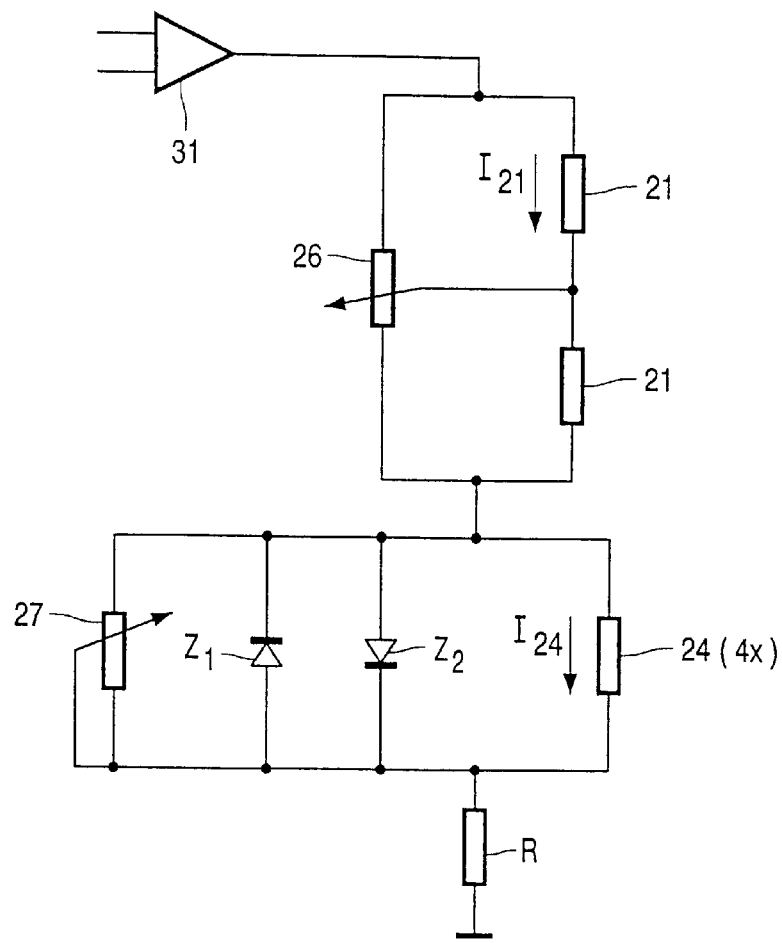
FIG. 3 shows schematically a circuit for a display device in accordance with the invention.

FIG. 3 illustrates schematically a circuit for a display device in accordance with the invention. The frame current generator 31 supplies a current $I_{21}$ through the vertical deflection coils 21 which, in this example, are placed in parallel with a resistor 26. The correction coils 24 are coupled to the deflection coils, but two Zener diodes $Z_1$ and $Z_2$ and, in this example, a resistor 27 are placed parallel across the correction coils. These Zener diodes are chosen to be such that the current $I_{24}$ through the correction coils 24 is topped at a maximum current value.

Figure 4:
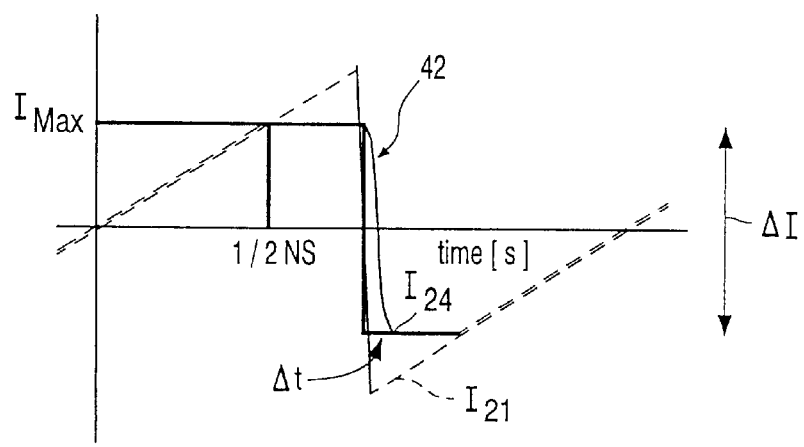
FIG. 4 illustrates the current through the compensation coils in relation to the current through the vertical deflection coils.

FIG. 4 shows schematically the currents $I_{21}$ and $I_{24}$ as a function of time. Initially, $I_{21}$ and $I_{24}$ are equal. Above a certain threshold value $I_{max}$ for $I_{21}$, the current $I_{24}$ is held at a fixed value $I_{max}$. The ratio between the two currents thus starts at 1 up to a certain deflection, whereafter it is reduced.

Figure 5A:
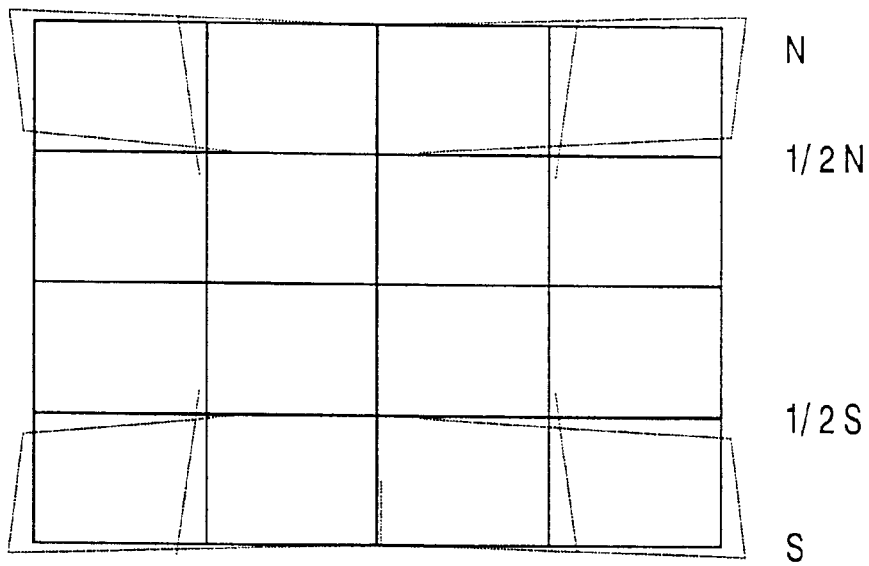
FIGS. 5A and 5B illustrate the raster correction with and without use of raster correction coils.
Figure 5B:
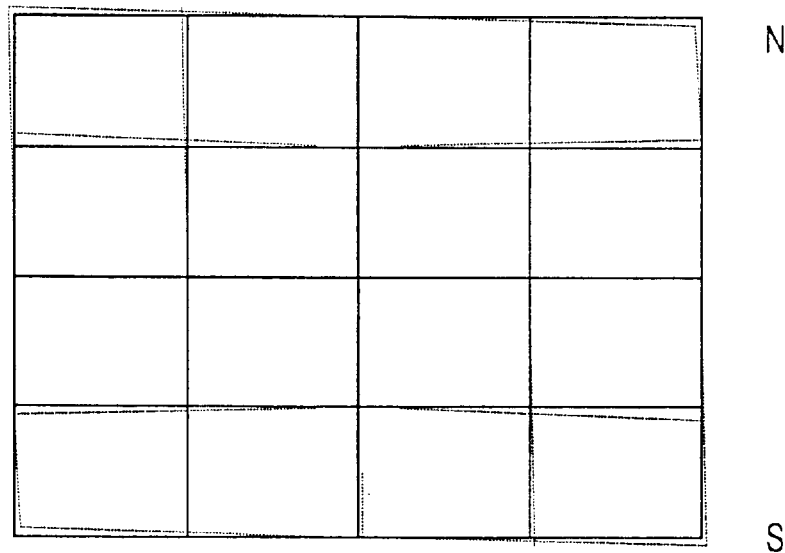

FIGS. 5A and 5B show schematically raster errors without application of raster correction coils 24 (FIG. 5A) and with correction of error coils (FIG. 5B), but with a constant ratio between the vertical deflection current and the current through the correction coils (i.e. $I_{21}/I_{24}$ is a constant value). FIG. 5A shows considerable raster errors. Raster errors up to 3 mm at full deflection may occur, which are clearly visible. As can be seen in FIG. 5B, the raster errors can be reduced to negligible values at full deflection (North and South) but some raster errors are left at 0.5 N and 0.5 S (typically of the order of 0.5 to 1 mm which is still visible). By sending more current through the correction coils 24 (or by using more turns), the raster errors at 0.5 N and 0.5 S can be reduced, however, at the expense of introducing raster errors at full deflection, because over-correction would occur.

The inventors have realized that the raster errors can be better corrected by reducing the ratio between the currents $I_{24}$ and $I_{21}$, i.e. such that, relative to the deflection current, the current through the correction coils 24 at full vertical deflection is less than that at half vertical deflection. Making use of the invention, with a ratio at full deflection which is less than a ratio at half deflection in this example, the raster errors can be reduced to such an extent that they are no longer visible on this scale.

The vertical deflection current exhibits a sudden change from full deflection in one direction to full deflection in the opposite direction. This change is called the 'fly-back'. In FIG. 4, the fly-back is shown by the steep step 42. There will be a time delay depending on the circuit used and indicated in FIG. 4 by $\Delta t$ between the currents $I_{21}$ and $I_{24}$ directly following fly-back. Current $I_{21}$ shows a value directly before fly-back and reaches a maximum value after fly-back. The difference between them is $\Delta I$ as indicated in FIG. 4. The delay time $\Delta t$ is calculated as the time between the start of the fly-back and the point at which roughly 90% of this difference is reached. This delay time is preferably less than 400 microseconds, preferably even less than 300 microseconds. Larger values for the time delay result in currents $I_{24}$ directly after fly-back (i.e. at full North deflection) which are less than wanted. The time delay time depends on the RC time of the circuit chosen (inclusive of the correction coils) and can be theoretically calculated and/or experimentally determined.

It will be clear that many more variations, within the scope of the invention, are possible to those skilled in the art.

What is claimed is:

1. A color display device comprising a cathode ray tube having a display screen, means for generating at least one electron beam, a vertical deflection unit for generating deflection fields for deflecting the at least one electron beam across the display screen, a vertical deflection current source producing a vertical deflection current through the vertical deflection unit, and magnetic field-generating means at or near a display screen-facing end of the deflection unit to reduce raster distortions, the magnetic field-generating means comprising correction coils and means for supplying said correction coils, in operation, with a correction current, wherein the ratio between the correction current and the vertical deflection current is a function of the vertical deflection and is less for full vertical deflection (N or S) than for half vertical deflection (0.5 N or 0.5 S).

2. The color display device as claimed in claim 1, wherein the ratio at full deflection is between 0.66 and 0.4 times the ratio at half vertical deflection.

3. The color display device as claimed in claim 1, wherein a delay time ($\Delta t$) between the vertical deflection current and the correction current reaching a maximum after fly-back is less than 400 $\mu$sec.

4. A display device comprising
   a cathode ray tube having a display screen;
   an electron gun generating an electron beam;
   a vertical deflection unit for vertically deflecting said electron beam across the display screen
   a vertical deflection current source for supply said vertical deflection unit with a vertical deflection current;
   a raster distortion correction coil adjacent a display end of said vertical deflection unit; and
   a raster distortion current source for supplying said raster distortion correction coil with a raster correction current;
   wherein a ratio of said raster correction current to said vertical deflection current is a function of the vertical deflection of said electron beam such that said ratio is less at full vertical deflection than for half vertical deflection.

5. The display according to claim 4 wherein said raster distortion correction coil is disposed between said vertical deflection unit and said display screen.

6. The display according to claim 4 wherein said raster distortion current source has the same frequency as said vertical deflection current source.

7. The display according to claim 4 wherein said raster distortion current source and said vertical deflection current source are derived from a frame current generator.

8. The display according to claim 7 wherein said frame current generator supplies current to a network comprised of:
   a series-parallel combination of series-connected vertical deflection coils that are shunted by a resistor; and
   a parallel network comprised of a correction coil, a first zener diode, and a second zener diode, wherein said first and second zener diodes form a bi-directional current limiting structure;
   wherein said series-parallel combination is connected in series with said parallel network.

9. The display according to claim 8 further including a parallel resistor that is connected in parallel with said correction coil.

10. The display according to claim 8 wherein said ratio of said raster correction current to said vertical deflection current is substantially linear until said bi-directional current limiting structure conducts.

11. The display according to claim 8 wherein said network further includes a series resistor that is in series with said parallel network.

12. A method of correcting raster distortion comprising:
    deflecting an electron beam using vertical current through vertical coils;
    correcting raster distortion by applying a correction current through correction coils such that a ratio of the correction current to the vertical current is a function of the deflection of the electron beam and such that the ratio is less at full deflection than at half deflection.

13. The method of claim 12 wherein the function is substantially linear at deflections that are less than half deflection.

14. The method of claim 12 wherein the function is substantially flat around full deflection.

15. The method of claim 12 wherein the function is symmetric.

* * * * *